(12) United States Patent
Wilson et al.

(10) Patent No.: US 8,131,229 B1
(45) Date of Patent: Mar. 6, 2012

(54) POLAR MODULATION WITH IQ ZEROING

(75) Inventors: Robert Wilson, San Diego, CA (US);
John B. Groe, Poway, CA (US);
Kenneth Scott Walley, Carlsbad, CA (US)

(73) Assignee: Quintic Holdings, Santa Clara, CA (US)

( * ) Notice: Subject to any disclaimer, the term of this patent is extended or adjusted under 35 U.S.C. 154(b) by 770 days.

(21) Appl. No.: 12/249,725

(22) Filed: Oct. 10, 2008

Related U.S. Application Data (60) Provisional application No. 60/979,019, filed on Oct. 10, 2007.

(51) Int. Cl.
*H04B 1/66* (2006.01)
*H04K 3/00* (2006.01)

(52) U.S. Cl. ........ 455/102; 455/108; 455/110; 332/103; 332/145; 375/300; 375/302

(58) Field of Classification Search ................ 455/102, 455/108, 110, 114.3, 115.1, 127.2; 332/103, 332/145; 375/296, 300, 302
See application file for complete search history.

(56) References Cited

U.S. PATENT DOCUMENTS

| | | | |
|---|---|---|---|
| 7,764,139 B1 * | 7/2010 | Groe | 332/145 |
| 2001/0030581 A1 * | 10/2001 | Dent | 330/297 |
| 2003/0102910 A1 * | 6/2003 | Sevic et al. | 330/10 |
| 2009/0258612 A1 * | 10/2009 | Zhuang et al. | 455/110 |
| 2009/0278613 A1 * | 11/2009 | Jensen et al. | 331/16 |

* cited by examiner

*Primary Examiner* — Lee Nguyen (74) *Attorney, Agent, or Firm* — Blairtech Solution LLC

(57) ABSTRACT

Apparatus and methods for adjustment of spectral signal characteristics in polar modulators are described. A composite signal detection circuit is configured to detect when a signal trajectory of a composite signal provided to the polar modulator passes near the origin of a complex plane associated with the composite signal, and then adjusts the composite signal to pass through the origin. A spectral adjustment circuit is described to adjust AM and FM or PM components of the composite signal to reduce the deviation of an FM component of the composite signal.

19 Claims, 10 Drawing Sheets

One Embodiment of an IQ Zeroing System

FIGURE 1
WCDMA Transmit Signal Plotted on Complex Plane
(PRIOR ART)

FIGURE 2
Polar Transmitter
(PRIOR ART)

FIGURE 3a
Delta Sigma Modulator Diagram
(PRIOR ART)

FIGURE 3b
Noise Contribution of Delta Sigma Modulator

FIGURE 4a
Phase Frequency Modulation System
(PRIOR ART)

FIGURE 4b
Response of Each FM Path

FIGURE 5a
Dual Port VCO
(PRIOR ART)

FIGURE 5b
Response at Modulation Port

FIGURE 6
FM for a Typical WCDMA Signal

FIGURE 7a
One Embodiment of FM Folding
with Extended AM

FIGURE 7b
Resulting FM Signal

FIGURE 7c
Resulting AM Signal

FIGURE 8
Trajectory of Complex Signal Before
and After IQ Zeroing

FIGURE 9a
One Embodiment of an IQ Zeroing System

FIGURE 9b
Nyquist Pulses in the Time Domain

FIGURE 9c
Power Spectral Density of FM/PM Signals in the
Frequency Domain Before and After Processing

POLAR MODULATION WITH IQ ZEROING

CROSS REFERENCE TO RELATED APPLICATIONS

This application claims priority under 35 U.S.C. §119(e) to U.S. Provisional Patent Application Ser. No. 60/979,019, entitled POLAR MODULATION WITH IQ ZEROING, filed on Oct. 10, 2007. This application is also related to U.S. Pat. No. 6,985,703, entitled DIRECT SYNTHESIS TRANSMITTER, issued on Jan. 10, 2006, to U.S. Pat. No. 6,774,740, entitled SYSTEM FOR HIGHLY LINEAR PHASE MODULATION, issued on Aug. 10, 2004, to U.S. Provisional Patent Application Ser. No. 60/979,740, entitled FM PULSE SHAPING, filed on Oct. 12, 2007 and to U.S. patent application Ser. No. 11/369,897, entitled LINEAR WIDEBAND PHASE MODULATION SYSTEM, filed on Mar. 6, 2006. The content of each of these applications is hereby incorporated by reference herein in its entirety for all purposes.

FIELD OF THE INVENTION

The present invention relates generally to radio transmitters using polar modulation. More particularly but not exclusively, the present invention relates to apparatus and methods for reducing peak FM deviation without adversely affecting the spectrum of a composite transmit signal.

BACKGROUND OF THE INVENTION

Radio transmitters are used to generate the modulated signals required for wireless communications using modulation techniques such as QPSK, 8-P SK, 16-QAM, 64-QAM, and OFDM to vary the amplitude, phase, and/or frequency of the transmitter's RF carrier.

The modulated signal represents and conveys the message data consisting of in phase (I) and quadrature (Q) data streams. In practice, these data streams pass through digital filters that shape the resulting pulses and ultimately define the spectrum of the modulated transmit signal. A polar transmitter translates these I and Q data streams to equivalent amplitude (AM) and phase (PM) modulation signals. This allows these signals to be applied at more advantageous points in the transmitter, thereby increasing its efficiency.

Figure 1:
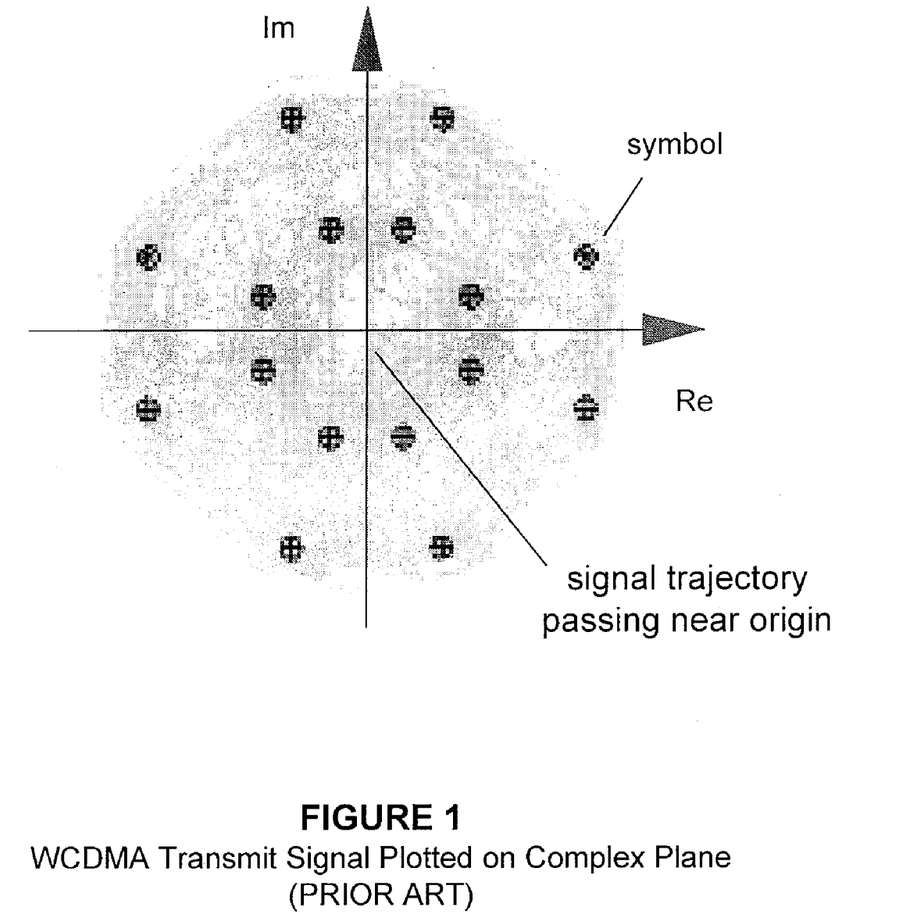
FIG. 1 shows the complex signal trajectory for a WCDMA transmit signal.

The PM signal is applied to the RF carrier at a phase-locked loop (PLL). In practice, this is actually accomplished using the equivalent frequency modulation (FM) signal, which is easily found by differentiating the PM signal. Unfortunately, the differentiation process widens the bandwidth of the FM signal and also generates impulses. This is due to the fact that the phase jumps by as much as $\pi$ whenever the transmit signal passes through or near the origin of the complex plane as shown in FIG. 1. The resulting FM impulses (that occur after differentiating the phase jumps), although infrequent, can be as strong as one-half of the data rate.

The FM signal's impulses and wide bandwidth present daunting challenges to the design of the polar transmitter. Any distortion of the FM signal alters the spectrum of the VCO output, elevates the noise floor around the transmit signal, and rotates the complex signal pattern. Practical circuits invariably reduce the bandwidth of the FM signal and degrade performance. More importantly, the VCO and PLL limit the peak FM deviation and corrupt the transmit output spectrum.

It would therefore be advantageous to reduce the peak FM deviation as well as the bandwidth of the FM signal.

SUMMARY

In one or more embodiments of the present invention, apparatus and methods for detecting and forcing the trajectory of a complex transmit signal to the origin when its amplitude drops below a threshold are described, providing potential advantages including reducing the mean value of the FM signal as well as reducing its wideband energy.

Additional aspects of the present invention are further described below with respect to the accompanying drawings.

BRIEF DESCRIPTION OF THE DRAWINGS

The following is a brief description of the drawings wherein:

FIG. 3b shows the noise contribution of a delta sigma modulator of the PLL as shown in FIG. 3a;

FIG. 5b shows the response at the modulation port of the dual port VCO of FIG. 5a;

FIG. 7b shows a resulting FM signal provided by the circuit of FIG. 7a;

FIG. 7c shows a resulting AM signal provided by the circuit of FIG. 7a;

DETAILED DESCRIPTION

Figure 2:
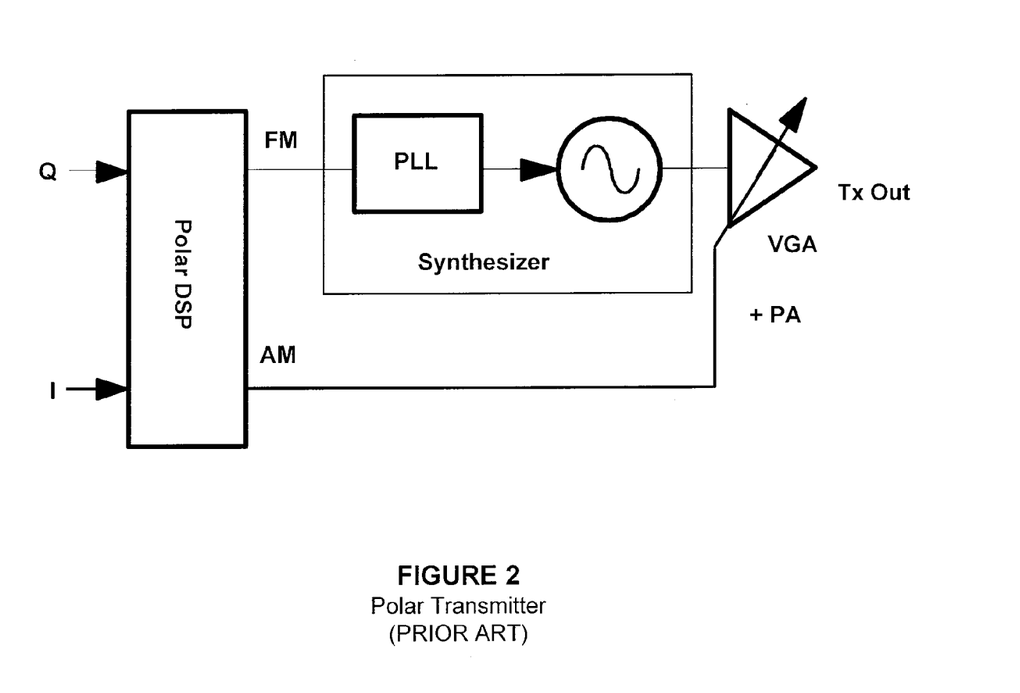
FIG. 2 shows a diagram of simple polar transmitter.

A simple diagram of a polar transmitter is shown in FIG. 2. The polar modulator synthesizes a transmit signal using direct phase modulation at the synthesizer and amplitude modulation at the variable gain amplifier (VGA) or power amplifier (PA).

Figure 3A:
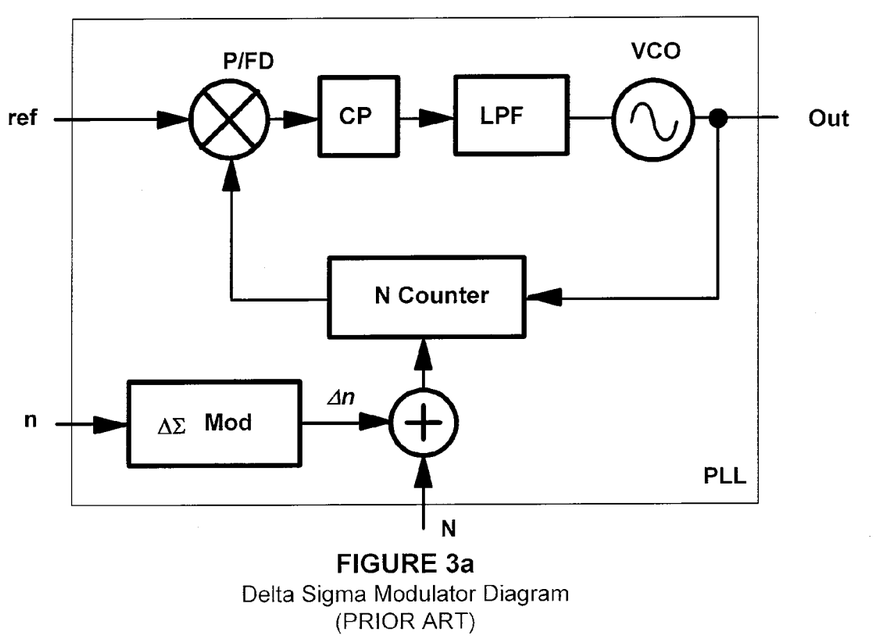
FIG. 3a shows a diagram of a fractional-N phase locked loop (PLL)

FIG. 3a shows a fractional-N phase-locked loop (PLL) used to synthesize the radio frequency (RF) carrier signal. The PLL forms a feedback system that consists of a voltage-controlled oscillator (VCO), N counter, phase/frequency detector (P/FD), charge pump (CP), and integration filter (LPF).

The PLL uses negative feedback to force the phase of the feedback signal to track the phase of the reference signal. As a result, the VCO oscillates at a frequency given by $$f_{VCO} = f_{REF}(N+n)$$

where n represents the fractional value and N equals the integer value.

The fractional-N phase-locked loop resolves fine frequency steps by modulating the value of $\Delta n$ so that its average value satisfies $$n = \frac{\Delta f}{f_{REF}} = \frac{1}{M}\sum_{i=1}^{M} \Delta n_i$$

The $\Delta\Sigma$ modulator forms a sequence of $\Delta n$ values with these important properties: 1) it responds to the input n quickly, 2) it possesses a resolution that improves with the number of samples, and 3) it concentrates quantization noise at high frequencies, near one-half the clock frequency.

The quantization noise can be attributed to the integer nature of the feedback counter. It possesses a quantization error of $\pm\frac{1}{2}$ around N or $$\Delta = \frac{1}{N}$$

Assuming a uniform distribution of this error leads to the noise spectral density function described by $$e_{rms}^2(f) = \frac{1}{12N^2 f_{REF}}$$

The $\Delta\Sigma$ modulator found in this polar transmitter shapes the quantization noise according to the transfer function $$\Delta\Sigma(z) = (1-z^{-1})^L$$

where L is the order of the modulator. It in turn feeds the feedback counter, which acts a digital accumulator and reduces its noise-shaping effects. That is, the feedback counter operates in such a way that the current output phase depends on its previous output phase. As a result, the transfer function of the feedback counter or prescalar becomes $$P(z) = 2\pi \frac{z^{-1}}{1 - z^{-1}}$$

Combining the above equations shows that the noise at the output of the feedback counter equals $$n^2(f) = e_{rms}^2(f)[\Delta\Sigma(f)]^2[P(f)]^2$$

which simplifies to $$n^2(f) = \frac{1}{3}\frac{\pi^2}{N^2 f_{REF}}\left[2\sin\left(\frac{\pi f}{f_{REF}}\right)\right]^{2(L-1)}$$

Figure 3B:
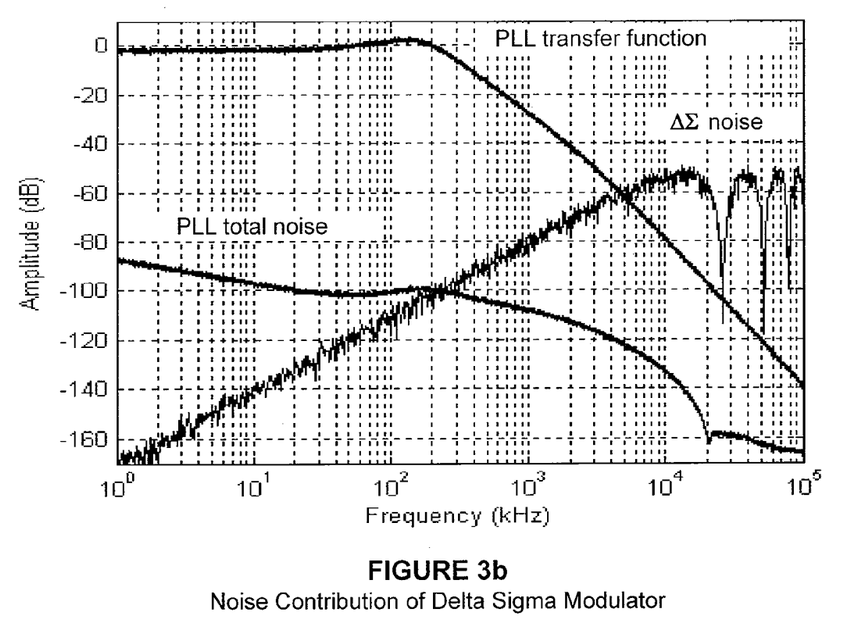

Ultimately, this noise must be attenuated by the loop filter and PLL transfer function to avoid excessive $\Delta\Sigma$ noise at the output of the PLL as shown in FIG. 3b.

Figure 4A:
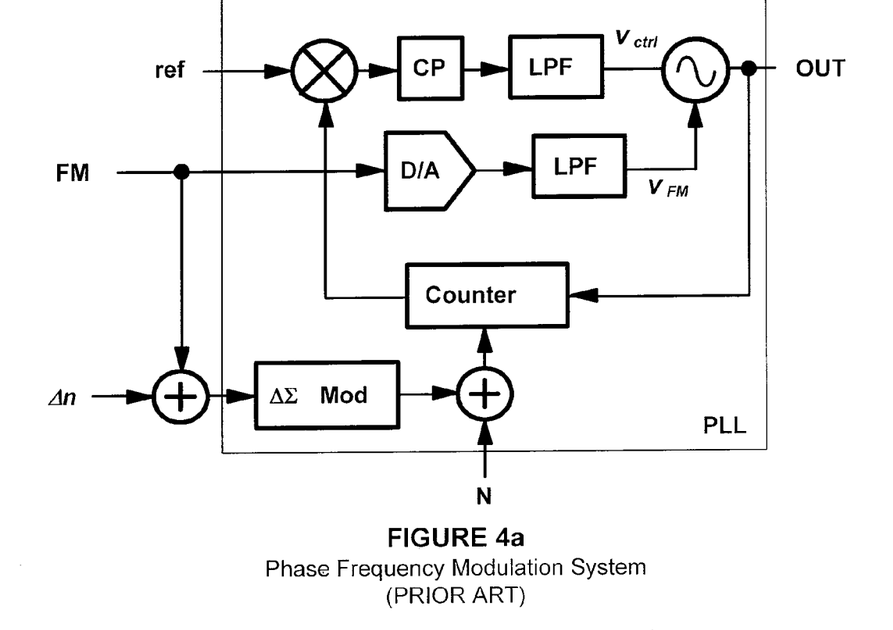
FIG. 4a shows a diagram of a phase/frequency modulator.
Figure 4B:
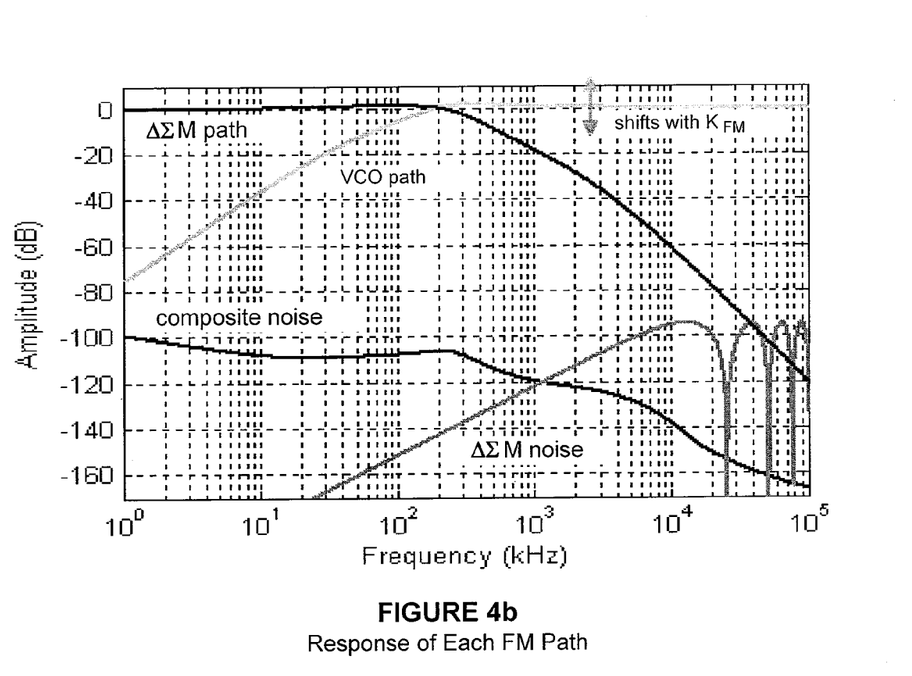
FIG. 4b shows the response of each of the modulation paths.

To support wideband direct phase/frequency modulation, the fractional-N phase-locked loop adds a direct path to the VCO as shown in FIG. 4a. This modifies the VCO output to $$v_{out}(t) = A\cos[\omega t + K_{VCO}\int v_{ctrl}(t)dt + K_{FM}\int v_{FM}(t)dt]$$

where $K_{VCO}$ and $K_{FM}$ represent the sensitivity of the control port and the direct frequency modulation port, respectively. The FM signal also feeds the $\Delta\Sigma$ modulator and the feedback counter. This results in two paths for the FM signal as illustrated in FIG. 4b and described by the transfer functions $$\Delta f = \frac{K_{PD}Z(s)K_V}{sN + K_{PD}Z(s)K_V}\text{FM}$$

$$\Delta f = \frac{sNK_{FM}}{sN + K_{PD}Z(s)K_V}\alpha\text{FM}$$

where $K_{PD}$ is the charge pump's gain, $Z(s)$ is the impedance presented by the loop filter, $K_V$ is the VCO's sensitivity at the tuning port, N is the value of the feedback counter, $K_{FM}$ is the VCO's gain at the modulation port, and $\alpha$ is a scaling parameter. Ideally, these two functions combine to realize a flat response. That is, the $\Delta\Sigma M$ path's response transitions smoothly to the VCO path's response and holds their combination at unity (0 dB). By its nature, the frequency modulation developed through the $\Delta\Sigma$ modulator is exact while, in contrast, the modulation formed at the VCO is sensitive to its gain $K_{FM}$ and the accuracy of scaling parameter $\alpha$.

Figure 5A:
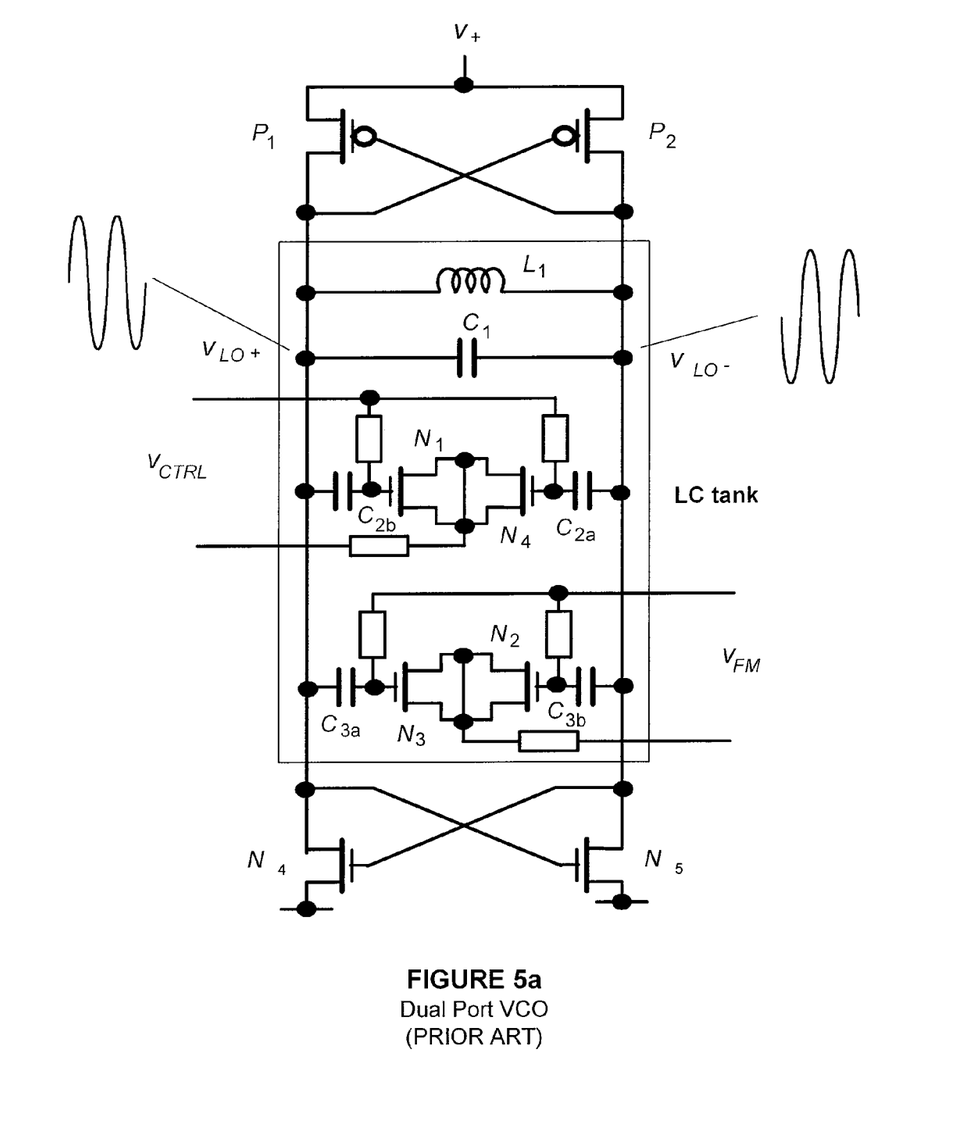
FIG. 5a shows a diagram of a dual port VCO.
Figure 5B:
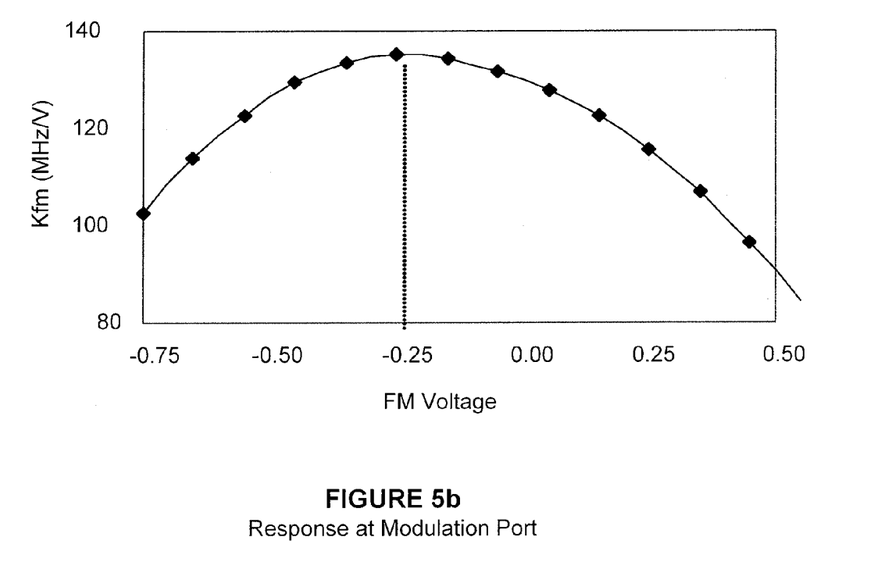

A key component of the direct phase/frequency modulator is the VCO shown in FIG. 5a. It uses complimentary MOS devices to replenish the losses in the LC resonator. The LC resonator consists of a differential inductor, coarse-tuning capacitors (not shown), and two variable capacitance structures based on accumulation-mode MOSFET devices. The accumulation-mode devices normally display an abrupt response, but impressing the large VCO signal across two back-to-back devices tends to linearize the response as shown in FIG. 5b. This is particularly important for wideband frequency modulation.

Figure 6:
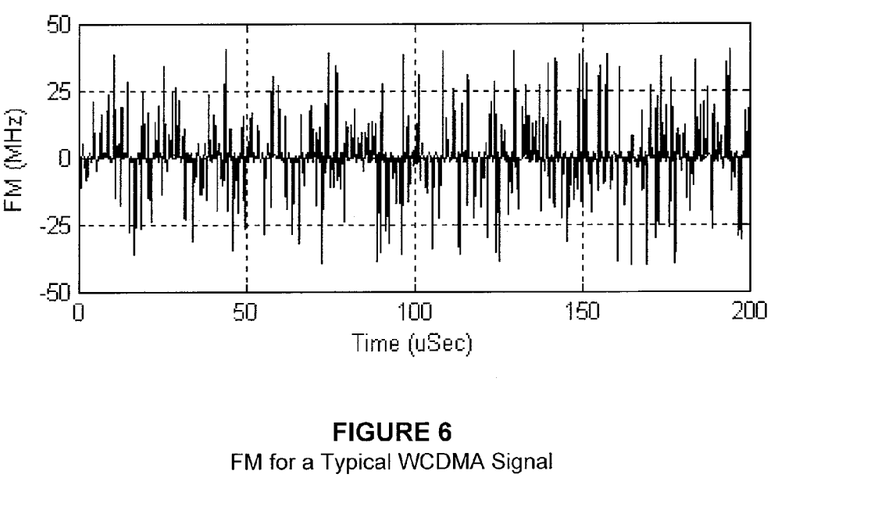
FIG. 6 shows the FM signal for a typical WCDMA transmit signal.

By design, signals applied to the control and modulation ports change the phase/frequency of the VCO output. Unfortunately, the VCO cannot discriminate between intended signals and noise. It therefore becomes important to minimize the noise as well as the sensitivity of these ports. Adding coarse-tuning capacitors to subdivide the VCO range lowers the sensitivity of the control port. Unfortunately, the nonlinear operations that form the FM signal can produce impulses as strong as one-half the FM data rate, as shown in FIG. 6. This is because the FM signal equals $$\text{FM} = \frac{\theta(n) - \theta(n-1)}{2\pi T_R}$$

where $T_R$ is the period of the phase ($\theta$) and FM data. As such, a phase shift of $\pm\pi$ equals an FM deviation of $\pm 1/(2T_R)$. In this example, the FM data rate equals 78 MHz, producing impulses approaching $\pm 39$ MHz.

It's possible to cut these FM impulses in half by extending the AM signal since these impulses correspond to phase shifts approaching $\pm\pi$. In practice, a phase shift of exactly $\pm\pi$ can be achieved by simply inverting the AM signal. This allows the strong FM impulses to map to a modified phase trajectory $\theta'$ given by $$\theta' = \theta \pm n\pi$$

where $\theta$ is the original phase and $n\pi$ represents the phase shift assigned to the AM signal. Alternatively, the strong FM impulses map to a modified FM' given by $$FM' = FM \pm \frac{1}{2T_R}$$

Figure 7A:
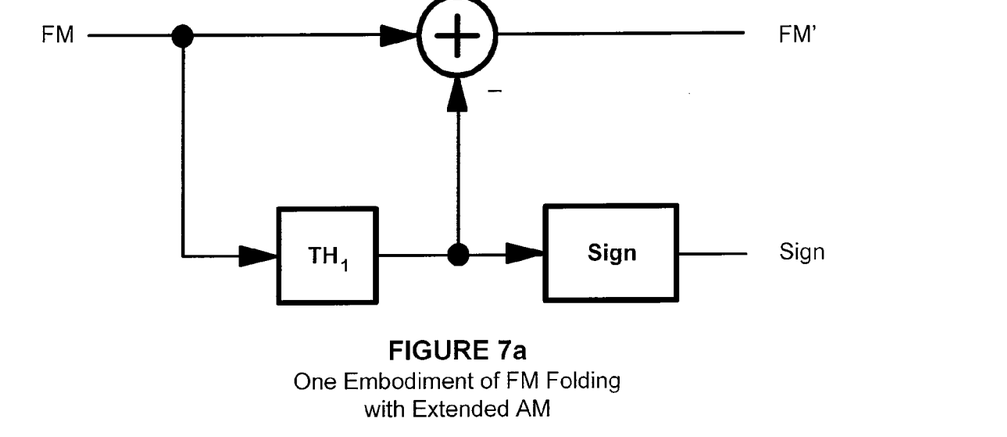
FIG. 7a shows one embodiment of a system for performing FM folding with extended AM in accordance with aspects of the present invention.
Figure 7B:
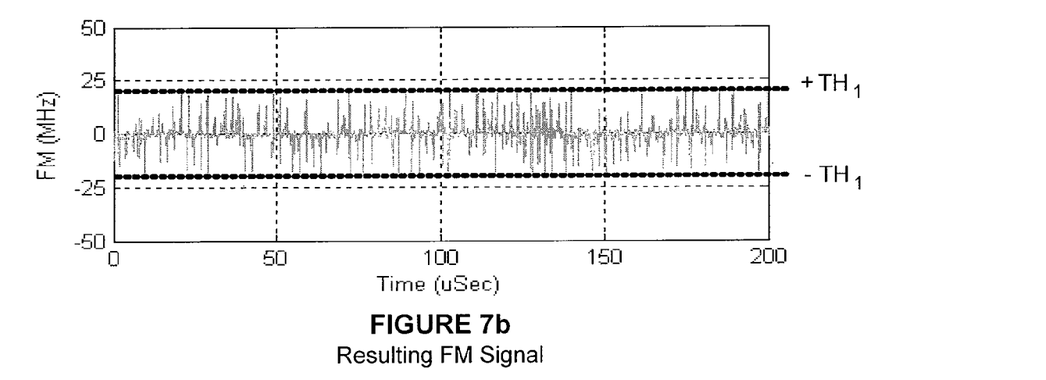

In essence, this operation folds strong FM impulses and effectively reduces the resulting or residual FM deviation. FIG. 7a shows one embodiment of a folding operation in accordance with the present invention at the threshold $TH_1$. This implementation inverts the polarity of the AM signal and removes the equivalent FM step from the FM signal whenever it exceeds the threshold. With the threshold set exactly to $$TH_1 = \frac{1}{4T_R}$$

the FM peaks fold over as shown in FIG. 7b. This effectively halves the FM range while it doubles the AM range (by making it bipolar).

Figure 7C:
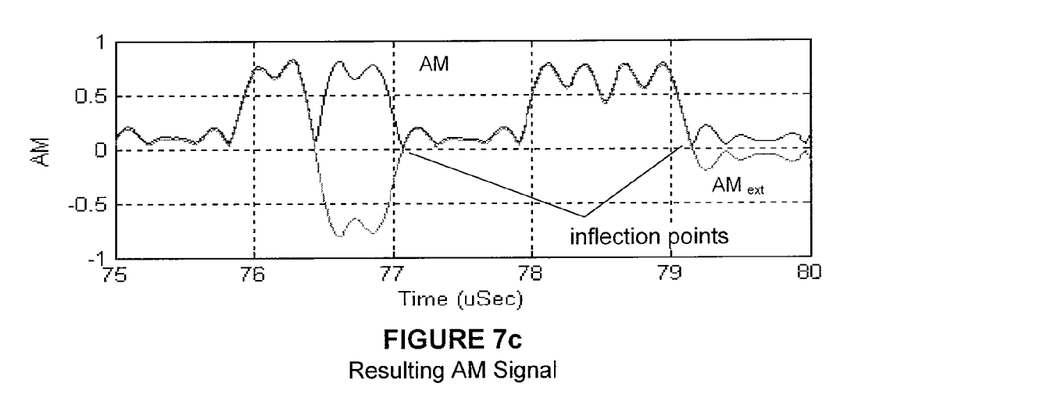

Conveniently, these strong FM impulses only occur when the AM signal moves towards zero. As a result, extending the AM signal actually smoothes the signal by removing inflections near zero as shown in FIG. 7c. In this example, the FM signal has been folded at about 76.4 μs, 77.1 μs, and 79.2 μs—flipping the polarity of the AM signal each time.

The strong FM impulses invariably occur when the composite transmit signal moves towards the origin (as mapped in the I/Q plane). This oftentimes corresponds to when the trajectory of the complex signal transitions between symbol points. Fortunately, the location of the symbol points is much more critical than the actual trajectory of the transmit signal.

Figure 8:
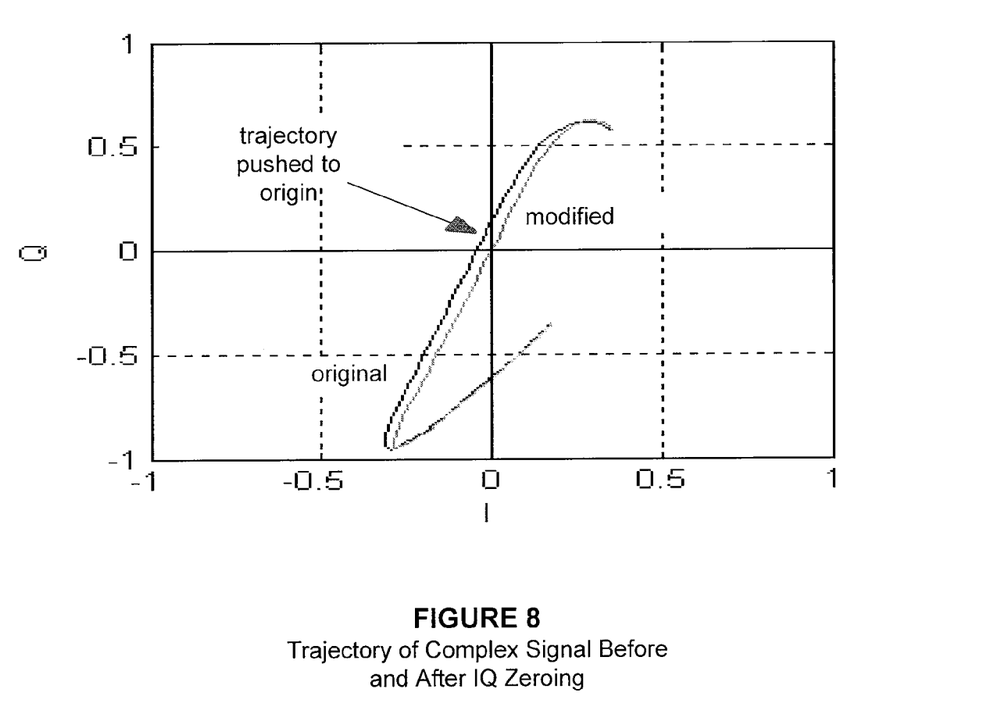
FIG. 8 shows example trajectories of a complex signal before and after IQ Zeroing to pass the signal directly through the origin, as implemented by one embodiment of the present invention.

In practice, it's possible to modify the signal's trajectory to provide some benefit but still route the transmit signal through the designated symbol points. This concept forces the signal trajectory that passes near the origin to actually pass through the origin as illustrated in FIG. 8. The result can be used to trigger FM folding, which flips the polarity of the AM signal and as a result better produces the FM impulse.

Figure 9A:
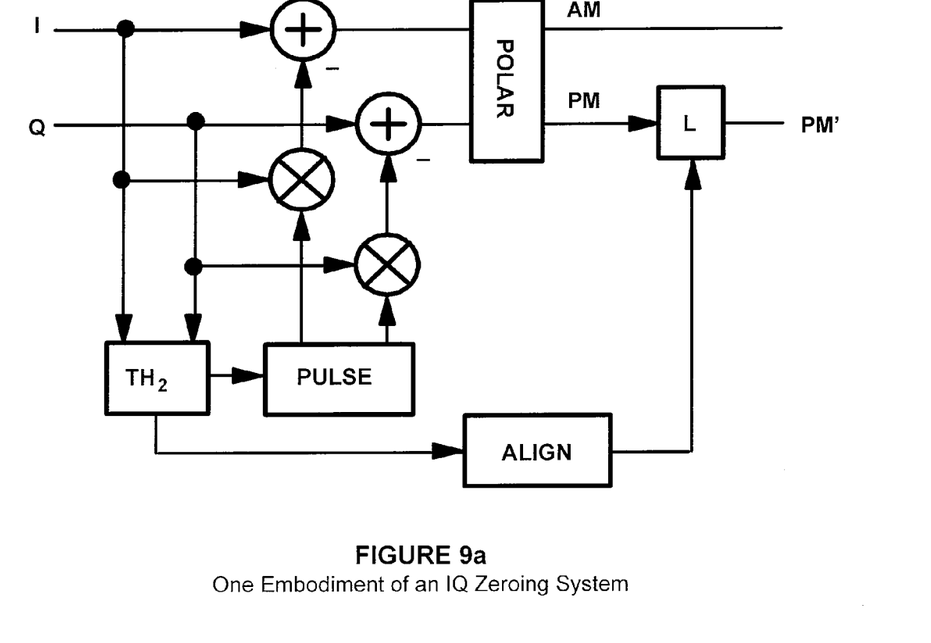
FIG. 9a shows one embodiment of a system for implementing IQ zeroing in accordance with aspects of the present invention.

In one embodiment, the signal trajectory may be forced through the origin by using Nyquist pulses. These pulses may be added to the transmit signal whenever its complex trajectory (or AM signal) falls below a designated threshold $TH_2$. In accordance with one embodiment, for ease of implementation the processing operates on I and Q data samples as shown in FIG. 9a. This implementation checks the I/Q values against the threshold $TH_2$. If less than the threshold, separate and distinct pulses are added to the I/Q data. The pulse added to the I channel is scaled by the I data to force it to zero. Similarly, the pulse added to the Q channel is scaled by the Q data to drive it to zero. As a result, both I and Q signals intersect zero.

Figure 9B:
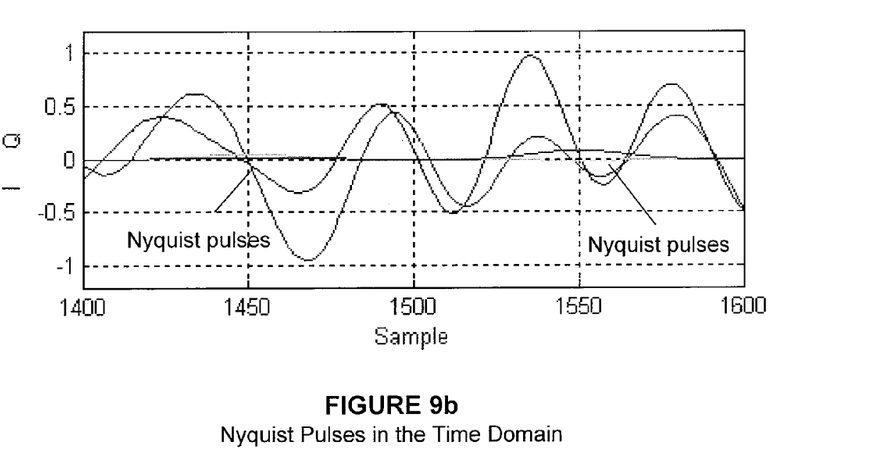
FIG. 9b shows Nyquist pulses combined with the I and Q signals, as may be used in embodiments of the present invention.
Figure 9C:
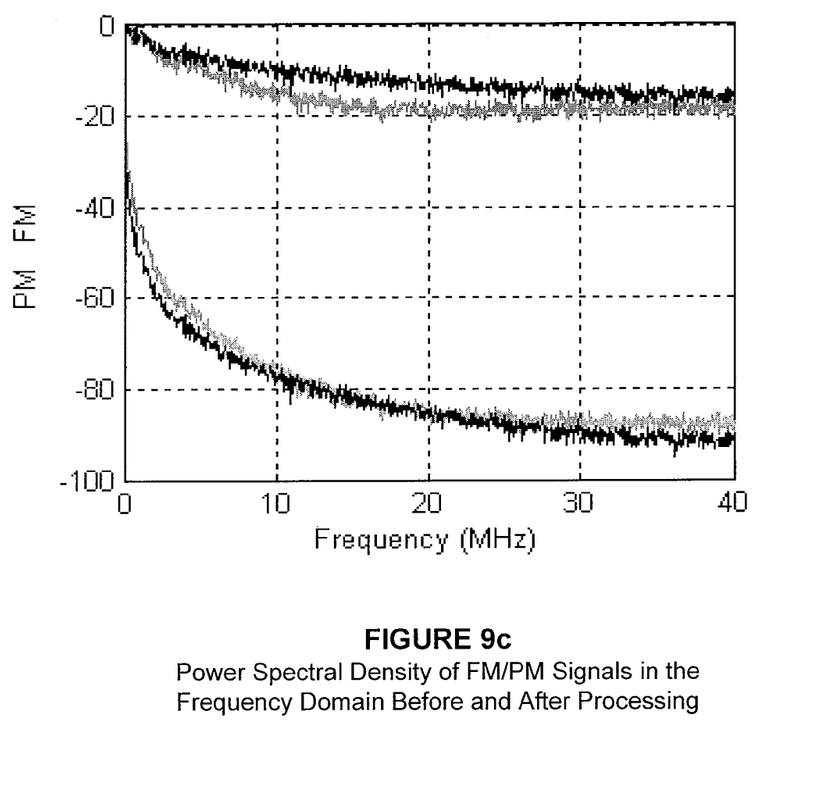
FIG. 9c shows the power spectral density (PSD) of FM/PM signals in the frequency domain before and after processing by addition of Nyquist pulses.

This processing alters the data streams as shown in FIG. 9b. As a result, the processing reduces the mean value of the FM signal (fewer FM peaks with generally less amplitude) and shapes the power spectral density of the AM and FM signals as shown in FIG. 9c.

In accordance with one embodiment, by design, the algorithm forces the FM impulse to occur when the AM signal equals zero. This may be accomplished by setting the PM sample—at the point n when the AM sample equals zero—to the same value as the previous PM sample with $$PM(n)=PM(n-1)$$

where PM is equivalent to θ. Then, the derivative operation used to find the FM samples and defined by $$FM(n)=PM(n+1)-PM(n)$$

properly positions the FM impulse at point n. In practice, setting PM(n)=PM(n−1) forces FM(n−1) to zero and usually pushes FM(n) to a value larger than threshold $TH_1$. This consequently folds FM(n) and better realizes the FM impulse.

In accordance with one or more embodiments, systems and methods for IQ zeroing may be used to advantageously decrease the wideband energy of the FM signal, which eases the design of the VCO and associated phase/frequency modulation system.

Some embodiments of the present invention may include computer software and/or computer hardware/software combinations configured to implement one or more processes or functions associated with the present invention, including those described above. These embodiments may be in the form of modules implementing functionality in software, hardware, and/or hardware software combinations. Embodiments may also take the form of a computer storage product with a computer-readable medium having computer code thereon for performing various computer-implemented operations, such as operations related to functionality as describe herein. The media and computer code may be those specially designed and constructed for the purposes of the present invention, or they may be of the kind well known and available to those having skill in the computer software arts, or they may be a combination of both.

Examples of computer-readable media within the spirit and scope of the present invention include, but are not limited to: magnetic media such as hard disks; optical media such as CD-ROMs, DVDs and holographic devices; magneto-optical media; and hardware devices that are specially configured to store and execute program code, such as programmable microcontrollers, application-specific integrated circuits ("ASICs"), programmable logic devices ("PLDs") and ROM and RAM devices. Examples of computer code may include machine code, such as produced by a compiler, and files containing higher-level code that are executed by a computer using an interpreter. Computer code may be comprised of one or more modules executing a particular process or processes to provide useful results, and the modules may communicate with one another via means known in the art. For example, some embodiments of the invention may be implemented using assembly language, Java, C, C#, C++, or other programming languages and software development tools as are known in the art. Other embodiments of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A method for adjusting spectral characteristics in a polar modulator, comprising:

receiving an amplitude modulation (AM) signal representative of an AM modulation component of a composite transmit signal;

receiving a frequency modulation (FM) or phase modulation (PM) signal representative of an FM or PM modulation component of the composite transmit signal;

detecting when a first signal trajectory of the composite transmit signal passes substantially through the origin of a complex signal plane associated with the composite transmit signal; and responsive to said detecting generating an adjusted composite transmit signal by;

adjusting the AM modulation signal to generate an adjusted AM modulation signal; and adjusting the FM or PM modulation signal to generate an adjusted FM or PM modulation signal;

wherein the AM modulation signal and the FM or PM modulation signal are adjusted to reduce the FM deviation of the adjusted composite transmit signal.

2. The method of claim 1 further comprising generating an adjusted transmit output signal by:

providing said adjusted FM or PM modulation signal to a voltage controlled oscillator (VCO); and providing said adjusted AM modulation signal to an amplifier coupled to the VCO.

3. The method of claim 1 further comprising:

Receiving in-phase (I) and quadrature (Q) signals representing said composite transmit signal; and generating said AM modulation signal and said FM or PM modulation signal from said I and said Q signals.

4. The method of claim 1 wherein said detecting when a first trajectory of the composite transmit signal approaches the origin comprises:

selecting a first threshold value;

determining if the amplitude of the FM modulation signal exceeds the first threshold value; and responsive to said determining, inverting the polarity of the AM modulation signal to generate the adjusted AM modulation signal.

5. The method of claim 4 further comprising removing an FM step value above the first threshold value from the FM modulation signal to generate the adjusted FM modulation signal.

6. The method of claim 5 wherein the first threshold is set to a value that is inversely proportional to the period of the FM data.

7. The method of claim 6 wherein the first threshold is set to a value of ($\frac{1}{4}T_R$), where $T_R$ is the period of the FM or PM data.

8. A method for modifying signal trajectories in a polar modulator, comprising:

detecting a signal trajectory of a composite transmit signal, provided to the polar modulator, that passes near the origin of a complex signal plane associated with the composite transmit signal; and adjusting the composite transmit signal to generate an adjusted composite transmit signal, wherein a corresponding signal trajectory of the adjusted transmit signal passes substantially through the origin of the complex signal plane.

9. The method of claim 8 wherein said detecting a signal trajectory comprises:

comparing the magnitude of the composite transmit signal to a first threshold value; and signaling detection if the magnitude is below the first threshold value.

10. The method of claim 8 wherein the composite transmit signal comprises an in-phase (I) signal and a quadrature (Q) signal.

11. The method of claim 10 wherein said detecting a signal trajectory comprises:

determining, based on the I signal and the Q signal, the magnitude of an AM signal component of the composite transmit signal;

comparing the AM signal component magnitude to a first threshold value; and signaling detection if the AM signal component magnitude is below the first threshold value.

12. The method of claim 10 wherein said adjusting the composite transmit signal comprises adjusting the I signal and the Q signal to generate a corresponding adjusted I signal and adjusted Q signal, wherein the adjusted I signal and the adjusted Q signal have amplitude values of zero at one or more sample times.

13. The method of claim 12 wherein said adjusted I signal and said adjusted Q signal are generated by combining a first Nyquist pulse signal with the I signal and a second Nyquist pulse signal with the Q signal.

14. The method of claim 13 wherein said first and second Nyquist pulse signals are generated by:

generating a normalized Nyquist pulse signal;

scaling the normalized Nyquist pulse signal by an I channel data value to generate the first Nyquist pulse signal; and scaling the normalized Nyquist pulse signal by a Q channel data value to generate the second Nyquist pulse signal.

15. The method of claim 13 further comprising generating a phase modulation (PM) adjustment signal from said adjusted I signal and said adjusted Q signal; and aligning, based on said PM adjustment signal, a PM component signal of the composite transmit signal to a zero crossing of the adjusted I and adjusted Q signals.

16. The method of claim 15 wherein said aligning comprises:

determining a first PM signal sample temporally occurring when the adjusted I signal and adjusted Q signal have values of zero or approximately zero; and setting the first PM signal sample to the value of the previous PM signal sample.

17. A method of adjusting spectral characteristics of signals m a polar modulator, comprising:

detecting a signal trajectory of a composite transmit signal, provided to the polar modulator, that passes near the origin of a complex signal plane associated with the composite transmit signal;

responsive to said detecting, generating an adjusted composite transmit signal, wherein said adjusted composite transmit signal has an adjusted signal trajectory that passes substantially through the origin of the complex signal plane; and generating a second adjusted composite transmit signal by adjusting an FM or PM signal component of said adjusted composite transmit signal and an AM signal component of the adjusted composite transmit signal to reduce the FM deviation of the second adjusted composite transmit signal.

18. An apparatus for modifying signal trajectories in a polar modulator, comprising:

a signal detection circuit configured to detect a signal trajectory of a composite transmit signal, provided to the polar modulator, that passes near the origin of a complex signal plane associated with the composite transmit signal; and a composite signal adjustment circuit configured to adjust the composite transmit signal to generate an adjusted composite transmit signal, wherein a corresponding signal trajectory of the adjusted composite transmit signal passes substantially through the origin of the complex signal plane.

19. A polar modulator comprising:

a phase-locked loop including a voltage controlled oscillator (VCO);

an amplifier; and a signal adjustment circuit coupled to said phase-locked loop and said amplifier, comprising:

a detection circuit configured to determine when a signal trajectory of a composite transmit signal, provided to the polar modulator, passes near the origin of a complex signal plane associated with the composite transmit signal;

a composite signal adjustment circuit configured to generate, in response to detection of said signal trajectory passing near the origin, an adjusted composite transmit signal, said adjusted composite transmit signal having an adjusted signal trajectory passing substantially through the origin of the complex signal plane; and a spectral adjustment circuit configured to generate a second adjusted composite transmit signal by adjusting an FM or PM signal component of said adjusted composite transmit signal and an AM signal component of the adjusted composite transmit signal to reduce the FM deviation of the second adjusted composite transmit signal.

\* \* \* \* \*